Oct. 23, 1956     P. E. SEKORA     2,767,475
MUSICAL INSTRUMENT MOUTHPIECE MEASURING GAUGE
Filed Jan. 14, 1954
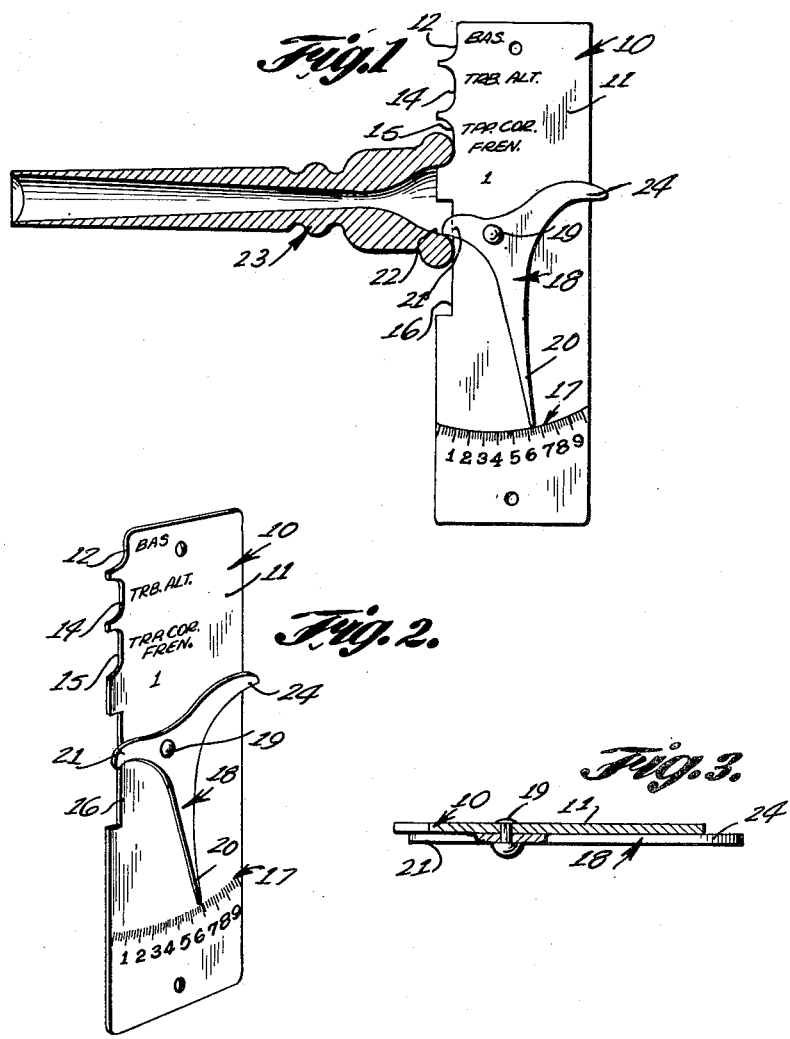
INVENTOR.
*Peter E. Sekora*
BY *Victor J. Evans & Co.*
ATTORNEYS

United States Patent Office 2,767,475
Patented Oct. 23, 1956

2,767,475

MUSICAL INSTRUMENT MOUTHPIECE MEASURING GAUGE

Peter E. Sekora, Pacoima, Calif.

Application January 14, 1954, Serial No. 403,974

2 Claims. (Cl. 33—148)

This invention relates to a gauge, and more particularly to a gauge for measuring the mouthpiece of a musical instrument.

The object of the invention is to provide an instrument or gauge which will facilitate the measurement of various types of mouthpiece cups for musical instruments such as trumpets, cornet, French horn, trombone and the like.

Another object of the invention is to provide a gauge which will permit musical instrument mouthpieces or cups to be measured with a high degree of precision or accuracy, and with ease and facility.

A further object of the invention is to provide a musical instrument mouthpiece measuring gauge which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a plan view of the mouthpiece measuring gauge of the present invention and showing a mouthpiece being measured, the mouthpiece being in section.

Figure 2 is a perspective view of the gauge.

Figure 3 is a side elevational view of the gauge, with parts broken away and in section.

Referring in detail to the drawings, the numeral 10 designates the gauge which includes a base plate 11 that is provided with a plurality of recesses 12, 14 and 15 along one edge thereof. Suitable indicia may be arranged contiguous to these recesses such as Bas., Tr. Alt., Trp. Cor., and Fren. A cutout or recess 16 is also provided in the edge of the base plate 11, and these cutouts and recesses are adapted to receive the mouthpiece 23 of the musical instrument being measured.

The base plate 11 is further provided with a scale 17 thereon which can be calibrated in any suitable units, and a body member 18 is pivotally connected to the base plate 11 by a suitable pivot pin 19. The body member 18 includes a pointer 20 which is adapted to coact with the scale 17, and the body member 18 further includes a finger 21 which is adapted to project into the recess portion 22 of the mouthpiece 23 in order to get an accurate measurement of the size of the recess 22 in the mouthpiece. The body member 18 further includes a lug 24 which is adapted to be engaged by the user's finger whereby the body member 18 can be adjusted as desired.

The gauge of the present invention can be used for measuring mouthpieces of various types of musical instruments. In use, the mouthpiece 23 is arranged so that a portion thereof engages one of the recesses 12, 14 or 15, and the other portion which is diametrically opposed projects into the cutout 16. Then, the body member 18 is pivoted by means of the finger engaging lug 24 until the finger 21 abuts the inner surface of the mouthpiece 23 at the cutout 22 as shown in Figure 1. Then, the pointer 20 will indicate on the scale 17 the size of the recess 22. It will be noted that the indicia or wording is arranged contiguous to the recesses which may be used as a guide for determining which of the recesses is to be engaged by the mouthpiece 23.

The gauge of the present invention can be used for determining the size of the mouthpiece of a musical instrument. The gauge can be made of any suitable material such as metal or plastic, and can be used for measuring mouthpieces of such instruments as trumpets, cornets, French horn, trombone, alto and bass horn. Since most mouthpieces are mass produced, the inside 22 of such mouthpieces varies considerable so that a musician has difficulty since such mouthpieces may not fit his lips and must be corrected but with the gauge of the present invention the width of the mouthpiece can be quickly and accurately ascertained. The gauge can be used by persons without a high degree of skill and all mouthpiece cups of instruments such as band instruments can be readily measured. Further, with the present invention mouthpieces can be compared in size with other mouthpieces and the gauge is extremely simple since it has only one movable part.

I claim:

1. A musical instrument mouthpiece measuring gauge comprising a base plate having a scale thereon, there being a plurality of recesses and a cutout spaced along an edge of said base plate, there being indicia on said base plate contiguous to said recesses, said recesses adapted to receive a musical instrument mouthpiece, a body member pivotally connected to said base plate and including a finger arranged contiguous to said cutout, a pointer extending from said body member for coaction with said scale, and a finger engaging lug arranged angularly with respect to said pointer and said finger for manually adjusting the body member.

2. In a musical instrument mouthpiece measuring gauge, a rectangular flat base plate having a scale thereon, said scale being arranged contiguous to an end of said plate, there being a plurality of recesses and a cutout spaced along an edge of said base plate, said cutout and recesses extending from the opposite end of said plate on which the scale is positioned, there being indicia on said base plate contiguous to said recesses, said indicia being on the same side of said plate as said scale, said recesses adapted to receive a musical instrument mouthpiece with a portion of the base plate between the cutout and recesses projecting into the mouthpiece, a body member pivotally connected to said base plate and including a finger arranged contiguous to said cutout and projecting into said hollow mouthpiece, a pointer extending from said body member for coaction with said scale, and a finger engaging lug arranged angularly with respect to said pointer and said finger for manually adjusting the body member, the end of said lug projecting beyond the side edge of said plate.

References Cited in the file of this patent

UNITED STATES PATENTS

| 305,036 | Abbott | Sept. 16, 1884 |
| 1,121,289 | Robertson | Dec. 15, 1914 |
| 2,665,488 | Tobey | Jan. 12, 1954 |

FOREIGN PATENTS

| 45,167 | Switzerland | Sept. 16, 1908 |